United States Patent [19]

Eberth et al.

[11] Patent Number: 6,133,834
[45] Date of Patent: Oct. 17, 2000

[54] METHOD OF TRIMMING FILM TYPE ANTENNAS

[75] Inventors: Gerhard Eberth, Eching; Heiner Brenninger, Kranzberg; Alfons Lichtenegger, Freising; Christian Ecker, Mainburg; Adolf Baumann; Wolfgang Ramin, both of Freising; Johann Hoffmann, Mengkofen; Konstantin Aslanidis, Dachau, all of Germany

[73] Assignee: Texas Instruments Deutschland, GmbH, Germany

[21] Appl. No.: 09/036,489

[22] Filed: Mar. 7, 1998

Related U.S. Application Data

[60] Provisional application No. 60/040,212, Mar. 6, 1997.
[51] Int. Cl.[7] .................................................. G08B 13/14
[52] U.S. Cl. ...................... 340/572.5; 29/593; 340/572.7
[58] Field of Search .............................. 340/572.7, 572.5; 29/593; 235/492, 494; 343/700 MS; 428/209

[56] References Cited

U.S. PATENT DOCUMENTS

| | | | |
|---|---|---|---|
| 5,444,223 | 8/1995 | Blama | 235/435 |
| 5,461,393 | 10/1995 | Gordon | 343/700 MS |
| 5,463,404 | 10/1995 | Wall | 343/700 MS |
| 5,495,230 | 2/1996 | Lian | 340/572.3 X |
| 5,754,110 | 5/1998 | Appalucci et al. | 340/572.5 |

*Primary Examiner*—Thomas Mullen
*Attorney, Agent, or Firm*—Rebecca Mapstone Lake; Frederick J. Telecky, Jr.

[57] ABSTRACT

A method of tuning the resonance frequency of a transponder to a target frequency is described, wherein a transponder comprises a film antenna with an IC (IC) mounted to the film antenna (L) and an integrated resonance capacitor (C) is part of a IC. During testing of IC at chip probe to determine the pass/fail of the IC, the integrated resonance capacitor (C) is measured and the value is stored with the pass/fail data of the wafer map. Then after mounting a passed IC (IC) to a film antenna (L) with variable inductance, retrieve the integrated resonance capacitance value from the wafer map and calculate the amount of inductance necessary to achieve the target frequency. Tune the film antenna (L) to achieve the necessary inductance, measure the transponder resonance frequency, and compare the transponder resonance frequency to the target frequency.

11 Claims, 3 Drawing Sheets

PARALLEL RESONANCE CIRCUIT WITH ANTENNA L, RESONANCE CAPACITOR C ON THE FILM AND THE TRANSPONDER INTEGRATED CIRCUIT WITH THE INPUT CAPACITOR Ci:

PARALLEL RESONANCE CIRCUIT WITH ANTENNA L ON THE FILM, THE RESONANCE CAPACITOR C INTEGRATED INTO THE IC:

LC RESONANCE CIRCUIT

CONDUCTIVE TRIMMING BRIDGES

CAPACITOR C

METHOD OF TRIMMING FILM TYPE ANTENNAS

This application claims priority under 35 USC § 119 (e)(1) of provisional application Ser. No. 60/040,212 filed Mar. 6, 1997.

FIELD OF THE INVENTION

This invention relates to RF-ID antennas in general and antennas printed on film or film layers with a printed antenna in specific.

BACKGROUND OF THE INVENTION

The manufacture of the lowest cost, highest performance version of an RF-ID system such that tags (transponders) could be disposable but also readable at approximately a meter distance, is oftentimes accomplished through the use of a capacitance circuit and antenna printed on a film, with a transponder IC mounted on top of the film, or just the antenna printed on the film, with a transponder IC mounted on the film, wherein the Transponder IC incorporates the capacitance of the resonant circuit. The Q of an antenna printed on film is dependent upon the number of turns (in addition to other factors), but what also is controlled by the number of turns is the effective inductance. In turn, the effective inductance, coupled with the capacitance of the resonant circuit, determines the resonant frequency.

The read range of the interrogator is dependent, in part, on the Q of the resonant circuit, because the higher the Q, the higher the read range. Another factor in determining read range is the sameness of the transponder response resonance frequency to the reader exciter frequency. In order to achieve the best possible reading/programming range the tag resonance frequency should be adjusted as close to the reader exciter frequency as possible. If the transponder resonant structure is comprised of inductor windings and capacitor blocks printed on some medium, i.e. film or foil, line width tolerances are not within the inductive and capacitive tolerances allowed. Therefore, some tuning of the transponder is necessary. Tuning in the most efficient and proficient way is the challenge.

SUMMARY OF THE INVENTION

A method of tuning the resonance frequency of a transponder to a target frequency, wherein said transponder comprises a film antenna with an IC mounted to said film antenna and an integrated resonance capacitor is part of said IC, comprising the steps of: testing and measuring an IC at chip probe to determine the pass/fail of the IC and to measure an integrated resonance capacitor; storing said integrated resonance capacitance value with the pass/fail data of a wafer map; mounting said pass IC to a film antenna with variable inductance; retrieving said integrated resonance capacitance value and calculating the amount of inductance necessary to achieve the target frequency in dependence upon said resonance capacitance value; tuning said film antenna to achieve the necessary inductance; measuring the transponder resonance frequency; and comparing said transponder resonance frequency to said target frequency and rejecting said transponder if said transponder resonance frequency is not said target frequency.

DETAILED DESCRIPTION OF THE PREFERRED EMBODIMENTS

Figure 1:
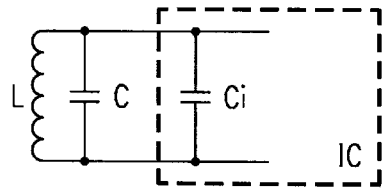
FIG. 1 shows a transponder consisting of a parallel resonance circuit with antenna L, resonance capacitor C on the film and the Transponder Integrated Circuit (IC) with the input capacitor Ci.
Figure 2:
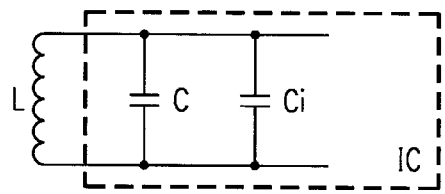
FIG. 2 shows a transponder consisting of a parallel resonance circuit with an antenna L on the film, and the resonance capacitor C integrated into the IC.
Figure 3A:
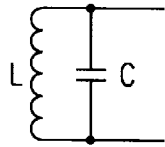
FIG. 3a shows the schematic of the transponder resonant circuit and one embodiment of the procedure on trimming the inductor on film and capacitor on film.
Figure 3A:
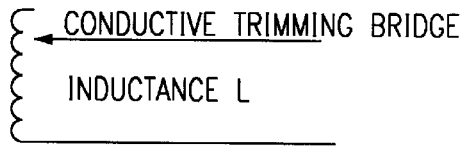
Figure 3A:
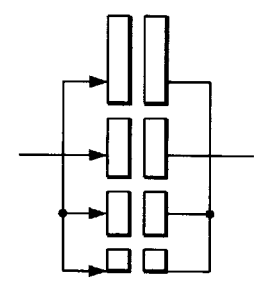
Figure 3B:
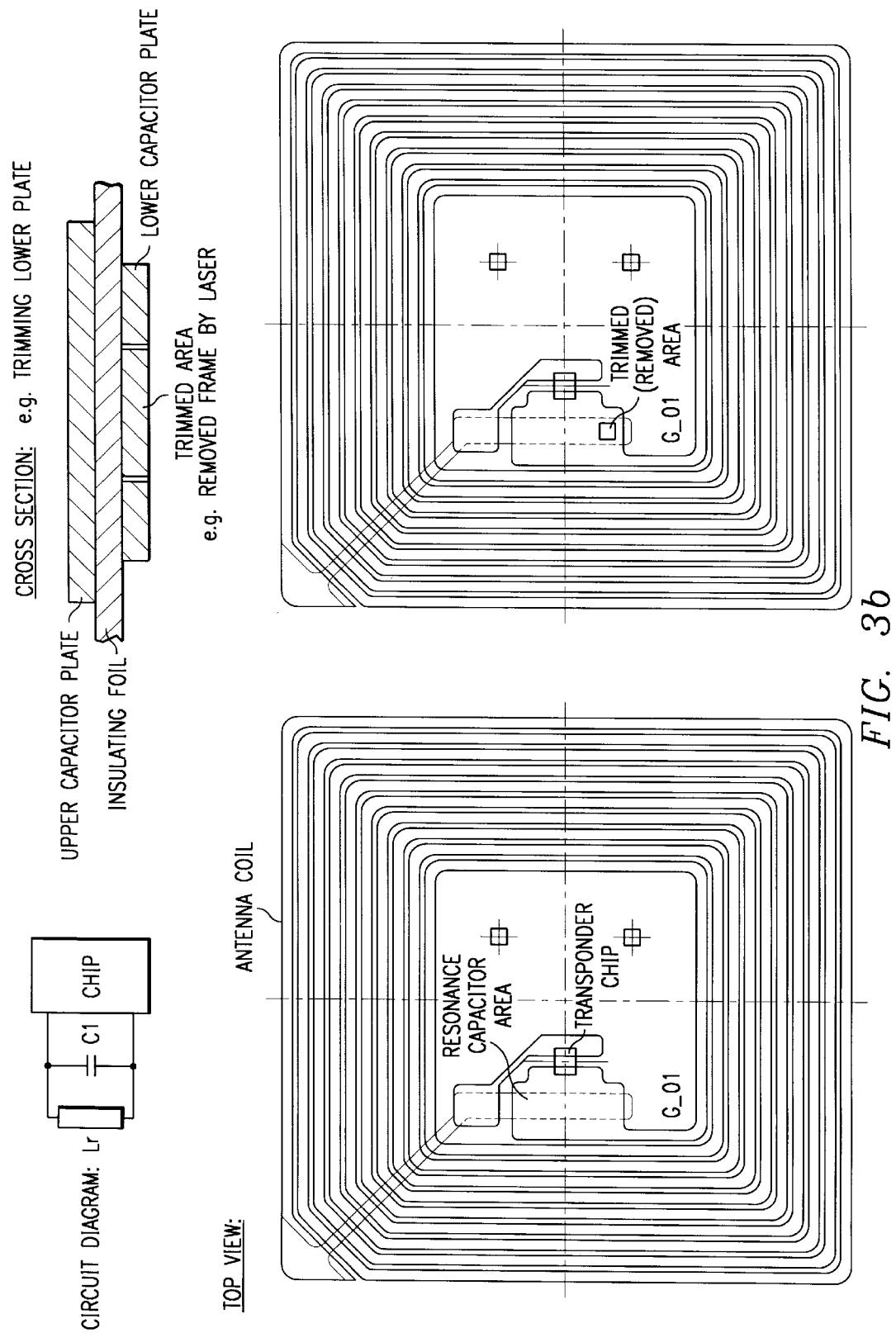
FIG. 3b shows the schematic of the transponder resonance circuit and a second embodiment of the procedure on trimming the capacitor on film.

The tag may consist of, for example, a parallel resonance circuit with antenna L, resonance capacitor C on the film and the Transponder Integrated Circuit (IC) with the input capacitor Ci as is shown in FIG. 1 or as shown in FIG. 2, a parallel resonance circuit with an antenna L on the film, and the resonance capacitor C integrated into the IC. The capacitor on the film may also be formed by two conductive plates on two opposite sides of the film, the latter acting as the dielectric of the capacitor as shown in FIG. 3b. Depending upon the resonance capacitor option, on film or integrated into the chip, different resonance frequency trimming options can be applied.

Figure 4:
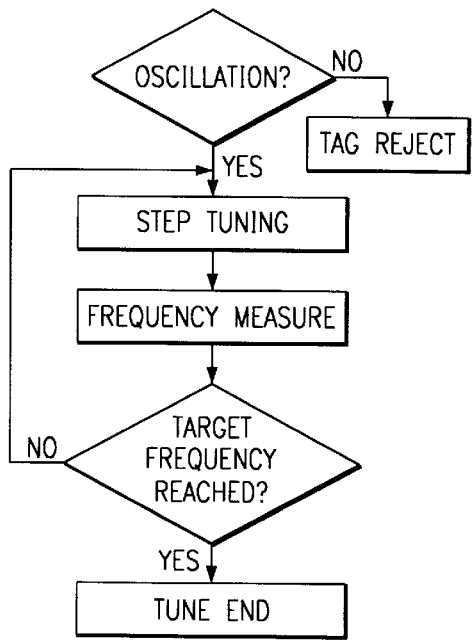
FIG. 4 shows the flow chart diagram of the tuning procedure for tuning when the resonance capacitor is on film.

Tuning the resonance capacitor on film, the start of the trimming the LC components of the untuned film are both at their maximum tolerances, or at a maximum capacitive and inductive value. Inductor or capacitor trimming may be achieved by increasing or decreasing the values by connecting or cutting conductive bridges on the film layer as shown in FIG. 3a. The flow chart shown in FIG. 4 depicts the tuning flow. First, the tag is checked for oscillation. If the tag does not oscillate, the tag is rejected. If the tag oscillates the first tuning step is taken (e.g. one or more capacitive or inductive trimming bridges are cut) and then the frequency of the resonance circuit is measured. After the frequency is measured it is compared against the target frequency. If the target frequency has been reached, the tuning ends, but if the target frequency has not been reached, the tuning procedure begins all over again with yet another capacitive or inductive bridge being cut and then continuing as set forth above, iteratively, until the target frequency has eventually been reached.

Trimming the resonance capacitor on the film can be effected by removing a portion of the capacitor plate on one side of the film by a laser beam or by punching a hole into the plates and the carrier film to reduce the area of the plates and thus the active capacitance area of the resonance capacitor. Typically, laser trimming of the resonance capacitor on film can be effected on one side of the film only. However, it is also possible to use a higher energy laser beam which cuts a hole through both plates and the carrier film and removes a portion of both the capacitor plates to effectively reduce the capacitance value.

Figure 5:
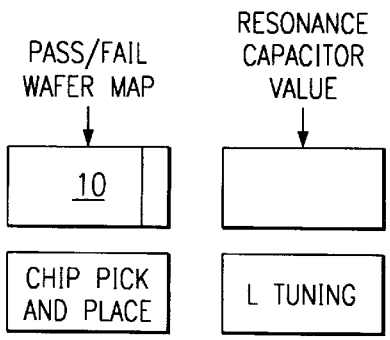
FIG. 5 shows that when the pass/fail wafer map is created at chip pick and place (probe), the integrated resonance capacitor is measured and the capacitance value is filed along with the pass/fail data on the wafer map.
Figure 6:
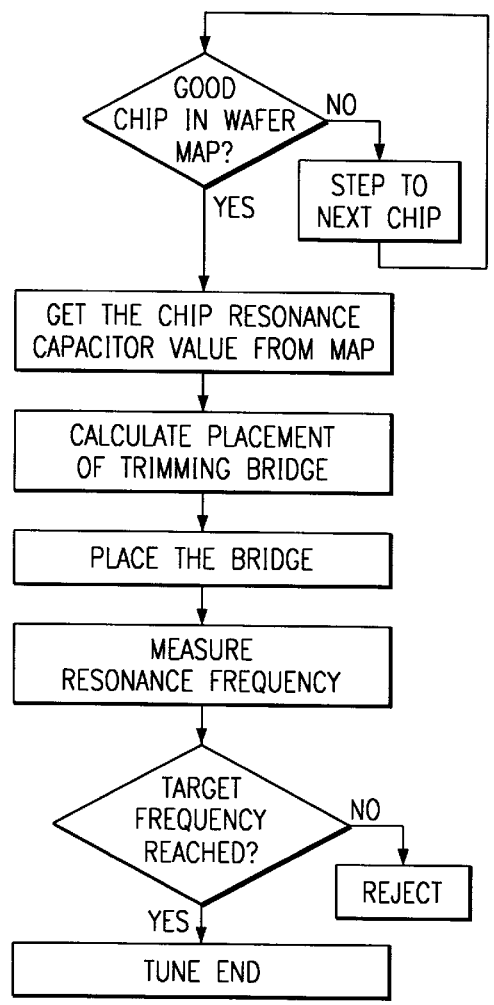
FIG. 6 shows a flow chart of the tag tuning method based on wafer map and integrated resonance capacitor value retrieved from file.

Tuning a transponder having the resonance capacitor integrated into the IC begins with measuring the integrated resonance capacitor at chip probe testing. The capacitor value is filed together with a chip Pass/Fail Wafer Map wherein the chip Pass/Fail Wafer Map defining the x-y position of a chip on a wafer. After chip mount onto the film the capacitor value is retrieved from the file, the inductance trimming portion is pre-calculated to achieve the desired resonance frequency and trimming to the target frequency is performed. A flow chart showing the steps in the flow is shown in FIG. 6. As a precursor to FIG. 6, FIG. 5 shows that when the pass/fail wafer map 10 is created at chip pick and place (probe) 12, the integrated resonance capacitor is measured and the capacitance value is filed along with the pass/fail data on the wafer map. Subsequently, according to the flow chart shown in FIG. 6, the chip is checked for goodness and stepped over if found to not be good. If the chip is found to be good, the associated capacitance value is retrieved from the file and, knowing the desired resonance frequency, the inductance tuning is calculated or the placement of the trimming bridge is calculated. The bridge is then placed, the resonant frequency of the tag is measured and compared against the target frequency. If the target frequency is met, the tuning is complete, otherwise, the tag is rejected.

An alternative trimming method to the flow shown in FIG. 6 is that upon discovering a 'good' chip, the resonance capacitor value is stored in the IC non-volatile memory and the chip is mounted to the film comprising an inductor. The tag is then activated to read the capacitor value, and the inductor tuning (bridge placement) is calculated from the resonance capacitor value. The bridge is placed, the resonance frequency measured and then a comparison is done between the measured resonance frequency and the target frequency. If the target frequency is reached, the tuning is complete. If the target frequency is not reached, the entire tag is rejected.

Another alternative trimming method is along with the IC containing the resonance capacitance, it also contains a trimming area to trim the resonance capacitor to the required value (in view of the achieved inductance and target resonance frequency) using RF.

What is claimed is:

1. A method of tuning the resonance frequency of a transponder to a target frequency, comprising the steps of:
    testing a transponder for oscillation, wherein said transponder comprises a film resonance inductor and a resonance capacitor on film with an IC mounted to said film;
    tuning either said capacitor or said inductor if said transponder does not oscillate;
    measuring said resonance frequency;
    comparing said measured resonance frequency to said target frequency;
    repeating said tuning and said measuring until said target frequency is achieved.

2. The method according to claim 1, wherein said capacitor or inductor start out at a maximum value.

3. The method according to claim 1, wherein said tuning comprises the step of reducing the inductance or capacitance.

4. The method according to claim 1, wherein said capacitor comprises two conductive plates on two opposite sides of the film.

5. The method according to claim 4, wherein said tuning comprises the step of removing a portion of one or both plates of said film capacitor.

6. The method according to claim 5, wherein said removing is effected by a laser.

7. The method according to claim 5, wherein said removing is effected by punching a hole through both said capacitor plates and said film thereby reducing the active capacitive area.

8. A method of tuning the resonance frequency of a transponder to a target frequency, comprising the steps of:
    providing a transponder wherein said transponder comprises a film antenna with an IC mounted to said film antenna and an integrated resonance capacitor is part of said IC;
    testing and measuring said IC while said IC is disposed on a wafer with at least one other IC to determine which ICs pass or fail said testing and to create a wafer map indicating which of said ICs disposed on said wafer have passed said testing and which of said ICs have failed said testing and to measure said integrated resonance capacitor of said ICs;
    storing said integrated resonance capacitance value associated with a particular IC with the data of said wafer map associated with said particular IC;
    mounting an IC which has passed said testing to a film antenna with variable inductance;
    retrieving said integrated resonance capacitance value associated with said IC which has passed said testing and calculating the amount of inductance necessary to achieve the target frequency in dependence upon said resonance capacitance value;
    tuning said film antenna to achieve the necessary inductance;
    measuring the transponder resonance frequency;
    comparing said transponder resonance frequency to said target frequency and rejecting said transponder if said transponder resonance frequency is not said target frequency.

9. The method according to claim 8, wherein said inductance is at a maximum at the start of tuning.

10. The method according to claim 8, wherein said tuning said film antenna comprises the step of reducing the amount of inductance.

11. A method of tuning the resonance frequency of a transponder to a target frequency, wherein said transponder comprises a film antenna with an IC mounted to said film antenna and an integrated resonance capacitor is part of said IC, comprising the steps of:
    testing and measuring said IC to determine whether the IC passes or fails said testing and to measure said integrated resonance capacitor of said IC;
    storing said integrated resonance capacitance value of said IC into a non-volatile memory of said IC;
    mounting an IC which has passed said tests to a film antenna with variable inductance;
    activating said transponder comprising said IC which has passed said testing to retrieve said resonance capacitance value from said non-volatile memory of said IC;
    calculating the amount of inductance necessary to achieve the target frequency in dependence upon said resonance capacitance value;
    tuning said film antenna to achieve the necessary inductance;
    measuring the transponder resonance frequency;
    comparing said transponder resonance frequency to said target frequency and rejecting said transponder if said transponder resonance frequency is not said target frequency.

* * * * *